L. P. HAYS.
ELECTRIC HEATING AND COOKING STOVE.
APPLICATION FILED DEC. 5, 1914.
1,161,667.
Patented Nov. 23, 1915.
2 SHEETS—SHEET 1.
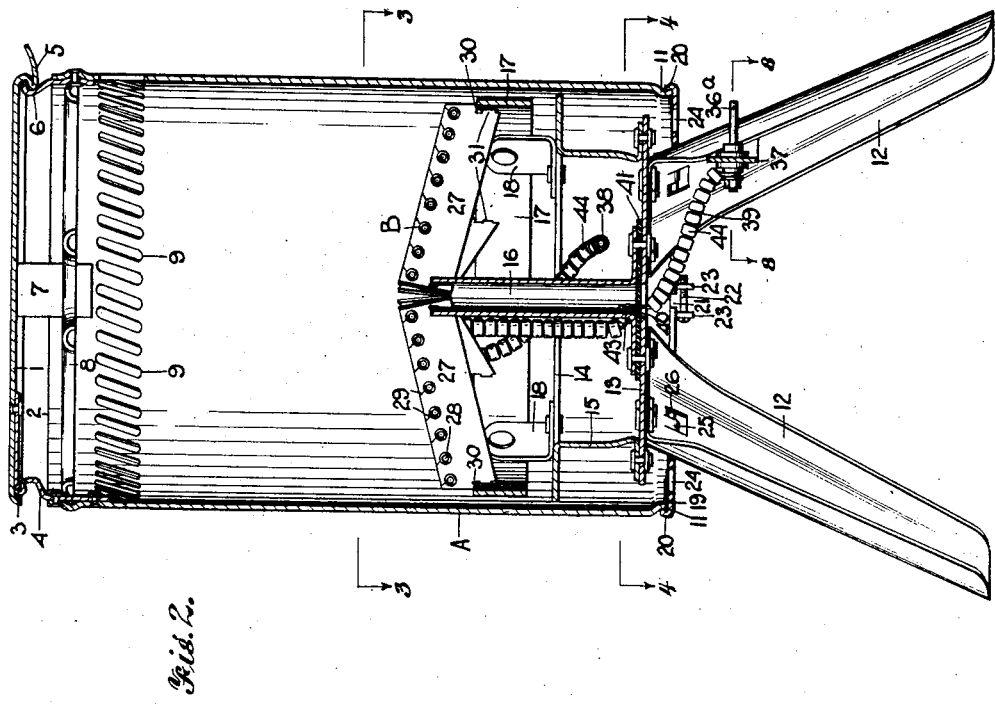
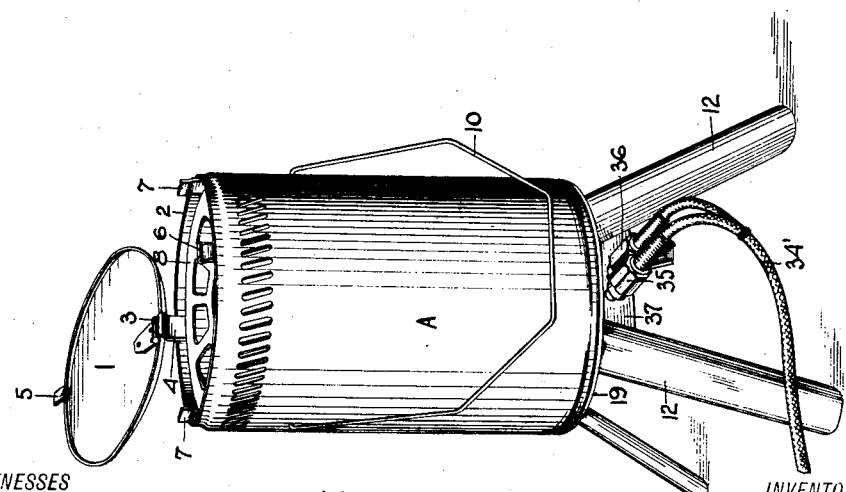
WITNESSES
INVENTOR
Leon P. Hays
BY
ATTORNEYS L. P. HAYS.
ELECTRIC HEATING AND COOKING STOVE.
APPLICATION FILED DEC. 5, 1914.
1,161,667.
Patented Nov. 23, 1915.
2 SHEETS—SHEET 2.
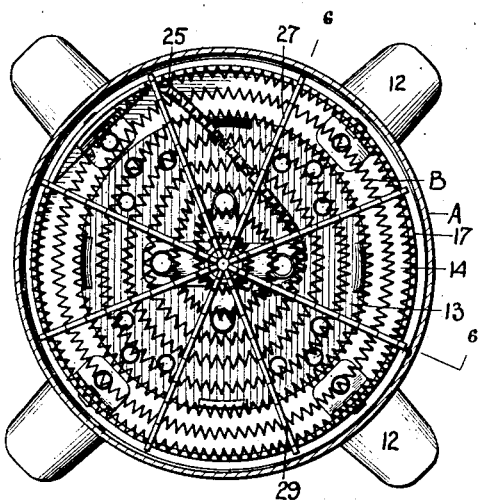
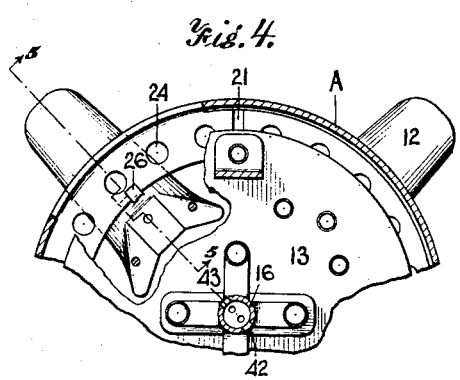
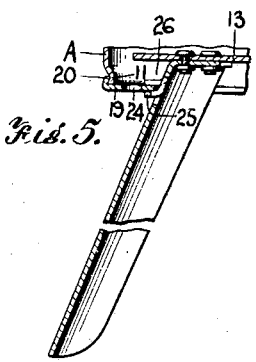
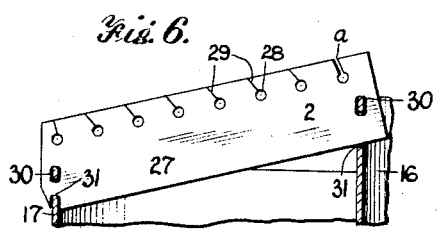
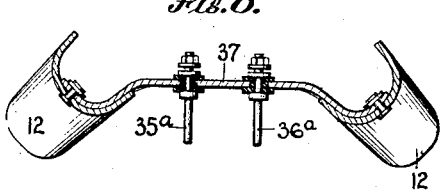
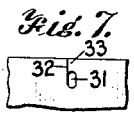
WITNESSES
GRPierce
CBradway
INVENTOR
Leon P. Hays
BY Munn&Co
ATTORNEYS

UNITED STATES PATENT OFFICE.

LEON P. HAYS, OF IDAHO SPRINGS, COLORADO.

ELECTRIC HEATING AND COOKING STOVE.

1,161,667.  Specification of Letters Patent.  Patented Nov. 23, 1915.

Application filed December 5, 1914. Serial No. 875,617.

*To all whom it may concern:*

Be it known that I, LEON P. HAYS, a citizen of the United States, and a resident of Idaho Springs, in the county of Clear Creek and State of Colorado, have invented a new and Improved Electric Heating and Cooking Stove, of which the following is a full, clear, and exact description.

This invention relates to an electric stove for room heating and cooking purposes, and it embodies an electric coil arranged within a casing through which air circulates and is effectively heated by the coil when the latter is traversed by current.

The invention has for its general objects to improve and simplify the construction and operation of electric heaters of the character referred to so as to be reliable and efficient in use, comparatively simple and inexpensive to manufacture and so designed as to heat a large current of air that circulates through the casing.

A further object of the invention is the provision of a simple, novel and effective supporter for the heating element, which comprises a wire arranged in the form of a spiral with its convolutions close together and out of contact so as to effectively heat the air, the wire preferably, although not necessarily, being helically wound, whereby a large radiating surface in a comparatively small compass is provided.

Another object of the invention is the provision of a heating element that includes a plurality of strips of mica or other insulation each arranged in a vertical plane and to which the convolutions of the heating wire are anchored, said strips of mica being arranged in a vertical plane so that they do not obstruct the upward flow of the air currents in passing through the heater.

A further object of the invention is the provision of a heater which embodies a frame that includes legs for supporting the heater and that also supports the heating element, and applied over this frame and supported on the said legs is the casing of the heater, which casing is open at the bottom to receive cold air, and also open at the top to permit the air after being heated by the heating element to escape into a room, the top of the casing being in the form of a flat lid so that a tea kettle or other utensil can be placed thereon or the lid can be opened and a cooking utensil can be supported in the top of the casing on a spider.

With such objects in view, and others which will appear as the description proceeds, the invention comprises various novel features of construction and arrangement of parts which will be set forth with particularity in the following description and claims appended hereto.

In the accompanying drawings, which illustrate one embodiment of the invention and wherein similar characters of reference indicate corresponding parts in all the views, Figure 1 is a perspective view of the electric heater with the lid thrown open; Fig. 2 is an enlarged vertical section of the heater; Fig. 3 is a horizontal section on the line 3—3 Fig. 2; Fig. 4 is a fragmentary sectional view on the line 4—4 Fig. 2; Fig. 5 is a detail sectional view on the line 5—5 Fig. 4; Fig. 6 is a sectional view on the line 6—6, Fig. 3; Fig. 7 is a fragmentary view showing the manner of attaching a mica supporting strip to the frame; and Fig. 8 is a horizontal section on the line 8—8, Fig. 2.

Referring to the drawing, A designates the casing of the stove which is shown of cylindrical shape, although this is immaterial. The casing is made of sheet metal so as to effectively radiate the heat, and at the top is a flat lid 1 which has its peripheral edge spaced from the top 2 of the body of the casing, so that heated air can readily pass out from under the cover. This lid or cover is hinged at 3 on an upwardly extending ear 4 fastened to the body of the casing, and a hook-shaped latch 5 is arranged on the lid at a point opposite from the hinge and engages a spring catch 6 that extends upwardly from and is secured to the casing body so that it supports the lid at a point opposite from the hinge and thereby a cooking utensil or tea kettle can be placed on the heater. Additional upstanding ears 7 are provided on the casing body so as to form further supporting means for the lid 1 when in closed position. Under the lid is a spider or apertured plate 8 which will support a utensil when the cover or lid is open. Just below this spider 8, which also serves to stiffen the upper part of the casing, the latter has closely arranged apertures 9 through which heated air can escape. For rendering the heater readily portable the body A has a swinging carrying bail 10 suitably attached thereto.

The bottom of the casing A is open so that it can be slipped downwardly over the frame or supporting structure on which the heating element is mounted, and the bottom edge is formed into an outwardly bent flange 11 for interlocking with a suitable part of the base or bottom section of the heater.

The base or bottom section of the heater comprises supporting legs 12, a horizontal plate 13 to which the legs are riveted, a horizontal ring 14 disposed above and fastened to the plate 13 by supports 15, a central standard or tube 16 fastened to the bottom plate 13, and a ring 17 fastened to lugs 18 which are carried by the horizontal ring 14. The supporting structure or frame formed by these various parts constitutes a unitary structure which extends into the body section A, with the exception of the legs 12, and carried by these legs is a horizontal clamping ring 19 which has its peripheral edge formed into an upwardly-turned and inwardly-bent flange 20 that interlocks with the flange 11 on the body A. This ring 19 is split at 21, Fig. 2, and the ends are connected by a suitable drawing device, such as a bolt 22, passing through lugs 23 on the ends of the ring. By unscrewing this bolt the ring expands so that the body section can be removed from the base section. This clamping ring 19 has air-admitting apertures 24, but as it is located below the plate 13 and extends inwardly under the edges thereof, air can enter the body A by passing upwardly through the ring and between the latter and plate 13, the air flowing upwardly under the plate 13 and thence upwardly through the stove. The clamping ring 19 is held in place by lugs 25 and 26 which are punched out from the legs 12, the lugs 25 engaging under the ring 19 and the lugs 26 engaging over the same.

On the base section of the heater is arranged the heating element B, which embodies a helically wound bare wire formed into a spiral with its convolutions suitably supported and separated. This coil is slightly conical and arranged with its base horizontal so that its entire area is exposed to the column of air that flows upwardly through the casing. This heating wire is mounted on a plurality of mica or other supporting strips 27 each of which has in its upper edge a plurality of openings 28 slightly below the upper edge, and extending from each opening to said edge is a slit 29 for permitting the heating wire to be inserted. The slits can be forced or sprung open, as shown at a, Fig. 6, and when the wire is inserted the slits will automatically close when the separating force is applied. These strips of mica 27 are radially arranged and have their inner ends supported on the tube 16 and their outer ends on the ring 17. Each strip has openings 30 at its ends for attachment to the tube 16 and ring 17, both of which are formed with openings 31, each of which is slit at 32, as shown in Fig. 7. The portion 33 adjacent the slit is bent backwardly so that the aperture 31 is open to the edge, and then a mica strip is inserted in this aperture and the portion 33 is bent back to enter the opening 30 in the mica strip. Thus the strips are firmly anchored in place without the need of separate fasteners. The heating element B is adapted to be connected with an ordinary lighting or other circuit, and a flexible cord conductor 34 may be used for this purpose, this conductor having socket connectors 35 and 36 that are slipped on the terminal plugs 35$^a$ and 36$^a$ which are carried by and insulated from a plate 37 fastened to two of the legs 12. Wires 38 and 39 lead from these plugs or terminal contacts to the heating element B, the said wires 38 and 39 passing through a central opening 40 in the bottom plate 13 through a piece of insulation 41 which is clamped between the base of the tube 16 and the bottom plate 13 and through openings 42 and 43 in the bottom of the tube 16, Fig. 4. Leading-in wires 38 and 39 are preferably protected by insulation beads 44, so that the wires will not become grounded on the metallic part of the frame structure.

The air to be heated enters the casing or body of the heater at the bottom and in rising it strikes the horizontal ring 14 and is deflected inwardly and thence rises through the heating element B, which is evenly distributed throughout the entire horizontal area of the casing. The ring 17 is arranged edgewise to the vertical so that it does not obstruct the upward flow of air. The air in passing the wire B is highly heated and naturally rises to and flows out of the top of the casing, being distributed from the latter evenly in all directions.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. A heater comprising a casing, supporting legs, a pair of lugs on each leg, a ring surrounding the legs and attached to each by being inserted between the lugs thereof, and interlocking means on the casing and ring.

2. A heater comprising a casing, a plate disposed in the bottom thereof, a heating element carried by the plate, supporting legs fastened to the said plate, a split ring mounted on the legs and disposed under the plate to permit air to pass into the casing to the space between the ring and plate, said ring having a flange embracing around the outside of the casing, and means for loosening the ring.

3. A heater comprising a casing, a plate in the bottom thereof with the periphery spaced from the casing for providing an entrance for air, a ring carried by and supported above the plate to deflect the rising air inwardly, and a heating element arranged above the said ring and through which the air passes in rising through the casing.

4. The combination of a casing into which air enters at the bottom, a horizontally disposed ring for deflecting the air toward the center, and a spirally wound substantially horizontal heating element disposed above and supported on the said ring, whereby the air is heated in passing through the element.

5. The combination of a casing, a supporting ring disposed therein, a central support, strips of insulation mounted on the ring and support and each disposed edgewise in a vertical plane, and a heating element mounted on the said strips.

6. The combination of a casing into which air enters at the bottom and from which air passes at the top, a central support within the casing, a ring support concentric with the central support, strips of insulation disposed radially with their inner ends on the central support and their outer ends on the ring support, and a heating element attached to and supported by the said strips.

7. A heater comprising a pair of supports, a plurality of strips of insulation disposed with their side faces in a vertical plane and having their ends fastened to the said supports, the upper edge of each strip having slits, and a heating wire supported by the strips and anchored thereto by insertion in the slits.

8. In a heater, the combination of a plurality of strips of insulation, supports for the ends thereof, each strip having openings in its ends, means on the supports engaging the openings, and a heating wire anchored to and carried by the said strips.

9. In a heater, the combination of a pair of supports, each having an upper edge provided with slits each terminating in an opening, strips of insulation having openings in their ends, and the ends being inserted in the slits and the portions of the strips between the openings thereof and the bottom edges being disposed in the openings of the said supports, and a heating element anchored to and carried by the said strips.

10. The combination of a casing, a central tube having its upper end provided with slits, a ring surrounding the tube and having its upper edge provided with slits, strips of insulation inserted in the slits of the tube and ring and supported thereby, and a heating wire supported on and anchored to the said strips.

11. The combination of a plate, a ring mounted above and secured to the plate, another ring mounted above and secured to the first mentioned ring, a central support mounted on the plate and extending upwardly through the rings, and a heating element carried by the central support and upper ring, with a casing surrounding the foregoing structure and open at the bottom to admit air, said first mentioned ring serving as a deflector for distributing air in rising through the heating element.

In testimony whereof I have signed my name to this specification in the presence of two subscribing witnesses.

LEON P. HAYS.

Witnesses:
W. J. WOODWARD,
JAMES UNDERHILL.